United States Patent [19]
Goldsberry

[11] 3,808,886
[45] May 7, 1974

[54] VOLUMETRIC FLOW METER
[75] Inventor: Fred L. Goldsberry, Dallas, Tex.
[73] Assignee: Lone Star Gas Company, Dallas, Tex.
[22] Filed: Sept. 25, 1972
[21] Appl. No.: 292,111

[52] U.S. Cl. .................................................. 73/264
[51] Int. Cl. ............................................. G01f 3/20
[58] Field of Search ............ 73/263, 264, 265, 266, 73/267

[56] References Cited
UNITED STATES PATENTS
| | | | |
|---|---|---|---|
| 3,415,121 | 12/1968 | Douglas | 73/264 |
| 3,161,049 | 12/1964 | St. Clair et al. | 73/267 |
| 1,200,572 | 10/1916 | Appell | 73/267 |

Primary Examiner—Richard C. Queisser
Assistant Examiner—Arthur E. Korkosz
Attorney, Agent, or Firm—Richards, Harris & Medlock

[57] ABSTRACT

A volumetric flow meter for measuring volumetric flow of fluids such as natural gas is provided which includes a bellows assembly having a pair of axially aligned reciprocally cooperating bellows members which alternately receive and exhaust fluid flow passing through the meter in a manner such that the expanding or inlet bellows receiving the gas flow causes positive displacement and contraction of the outlet bellows to exhaust gas therefrom; and a valve assembly is provided for reversing the function of the inlet and outlet bellows after the inlet bellows has fully extended. The meter is provided with a digital counter which records each complete expansion and contraction cycle of the bellows assembly. The valve in the valve assembly is actuated by a snap switch mechanism having a positive no-jam configuration.

15 Claims, 10 Drawing Figures

VOLUMETRIC FLOW METER

This invention relates to volumetric flow measurement. In another aspect, this invention relates to a novel gas meter which includes a simplified positive displacement bellows assembly with a novel valve and valve control mechanism.

Conventional gas meters which are utilized to measure and record the volume of natural gas flowing to various installations and the like, utilize bellows members to measure the flow of gas therethrough. In the conventional gas meter, the individual bellows functions as an independent measurement unit and is expanded and contracted by the inflow of gas through the meter. In addition, the expansion and contraction movement of each individual bellows in the meter housing is utilized to actuate inlet and outlet valves which allow gas pressure to be directed first to the interior of the bellows causing expansion and then to the exterior of the bellows, causing contraction thereof. The reciprocal movement of the bellows is transformed into rotating motion for operating the registering mechanism and which generally includes a combination of worms and worm wheels and the like which operate circular dials that record the volume of gas flowing through the meter. Thus, the conventional gas meters utilize valves which regulate gas flow to and from the interior of each bellows and the chamber which contains each bellows as well as rather sophisticated data readout means utilizing gears and rotating shafts which transform the reciprocal bellows motion into rotary motion for the registering mechanism. As a result of the complexity of the conventional meter, the valves, bearings for the rotary shafts, and worm gears of the registering mechanism must be periodically serviced and parts replaced due to normal wear and tear. In addition, the meter housing is made of a metal which is gradually degraded due to constant contact with corrosive impurities within natural gas.

Therefore, one object of this invention is to provide a novel volumetric flow measurement device.

Another object of this invention is to provide a novel gas meter.

A further object of this invention is to provide a novel gas meter having working parts of an improved design which require no maintenance throughout the life of the meter.

A further object of this invention is to provide a non-corrodible gas meter.

According to the invention, a volumetric flow meter is provided which includes a housing containing a basic flow measuring unit which includes a bellows assembly of two individual axially aligned bellows which are attached to opposite sides of a thrust plate flow barrier, each bellows communicating with a fluid inlet and a fluid outlet for the housing via a valve means which will simultaneously direct fluid from the inlet to one bellows and from the other bellows to the outlet, thereby utilizing gas entering the first bellows to force gas from the other bellows; and a snap switch mechanism operated by the extension of each bellows for moving the valve to thereby reverse the flow to the bellows assembly and allow inlet fluid to pass into the collapsed bellows and fluid in the extended bellows to communicate with the outlet.

According to one embodiment of this invention, a novel snap switch mechanism is provided for controlling said valve means of said flow meter which is actuated by a uni-directional motion of a control arm from said bellows assembly.

According to another embodiment of this invention, a novel valve mechanism is provided for the positive displacement volumetric flow meter of the subject invention.

According to another embodiment of this invention, a novel bellows configuration is provided for said volumetric flow meter wherein each bellows comprises an extensible flexible tubular body including outer annular convex semicylindrical reinforcing hoops; inner annular concave semicylindrical reinforcing hoops disposed between adjacent outer annular hoops and being of less diameter than said outer annular hoops, and flexible web sections interconnecting the sidewalls of said inner annular hoops with adjacent sidewalls of opposed outer annular hoops.

According to still another embodiment of this invention, the volumetric flow meter is disposed within a four piece molded plastic housing comprising a mating pair of annular housing midsections, and a pair of closure sections to enclose the mated annular housing midsections.

According to a further embodiment of this invention a digital counting means is provided for said volumetric flow meter for recording the expansion cycles of said bellows assembly.

This invention can be more easily understood from a study of the drawings in which.

Figure 1:
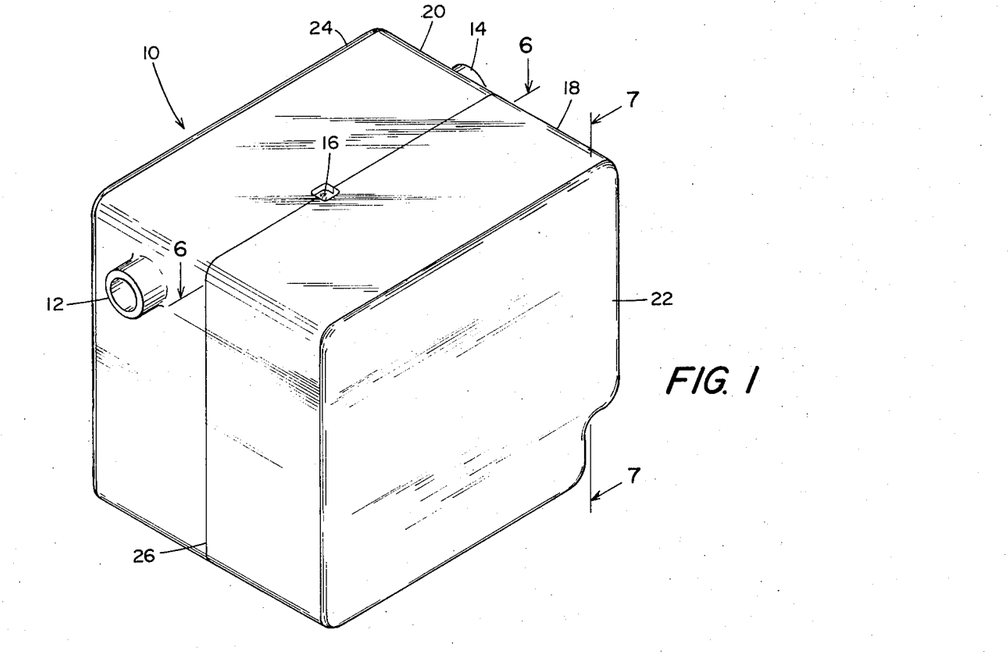
FIG. 1 is a perspective view of the volumetric flow meter of the subject invention.

Now referring to the drawings, the construction of a preferred volumetric flow meter which is made in accordance with this invention will be discussed in detail. FIG. 1 is a perspective view of a preferred flow meter made in accordance with this invention. As shown, meter 10 comprises a sealed housing having inlet conduit 12 and outlet conduit 14 operatively communicating therewith. Transparent readout window 16 is recessed on the upper midportion of the meter 10 and exposes the data registration window of a mechanical digital counter within the interior of the meter which records the volume of gas that is passed through the meter.

The housing of meter 10 comprises four basic molded units which have been sealed together. More specifically, housing halves 18 and 20 and side panels 22 and 24 are welded together in a manner illustrated in FIG. 1. It is noted that housing halves 18 and 20 and side panels 22 and 24 can be formed from any suitable material; however, they are preferably molded from a plastic material. Either thermosetting or thermoplastic materials can be used to form these components in the scope of the invention, but a thermoplastic material such as polyethylene is a preferred construction material. Housing halves 18 and 20 and side panels 22 and 24 are operatively joined together by a suitable technique such as welding or cementing to form the basic meter body which contains independent inlet and outlet gas flow chambers, a gas manifold having a slider valve seat, a frame for the slider valve actuating mechanism, integral inlet conduit 12 and outlet conduit 14 adapted for connection with external piping, and integrally molded fluid flow conduits interconnecting the internal inlet and outlet gas flow chambers with the gas manifold, and the gas manifold with a bellows assembly which will be described in detail below.

Figure 2:
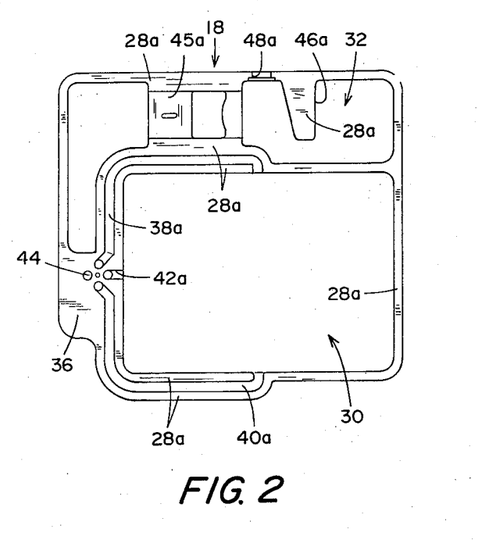
FIGS. 2 and 3 are elevational views of the individual annular housing sections of the meter of the subject invention.
Figure 3:
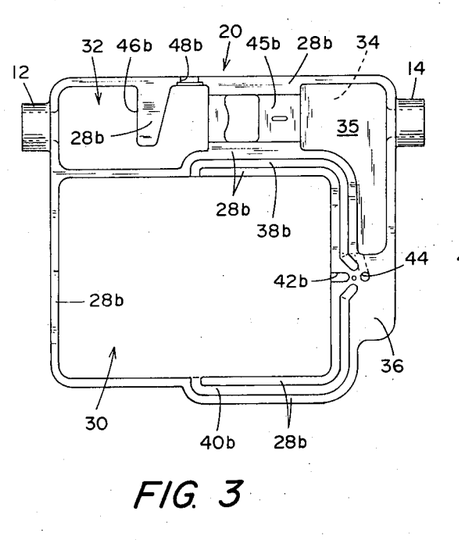

Some construction details of housing halves 18 and 20 are illustrated in FIGS. 2 and 3. As shown, FIGS. 2 and 3 are side elevational views of housing halves 18 and 20, respectively, as viewed normal to the faces of housing halves 18 and 20 at their point of connection 26 (FIG. 1).

As illustrated in FIGS. 2 and 3, the matching faces 28a and 28b of housing halves 18 and 20, respectively, to the most part are mirror images of one another and fit together to form the basic housing for meter 10. Matching faces 28a and 28b of housing halves 18 and 20, respectively, can be aligned and then cemented, welded or glued together to form the basic housing unit. Thus, the assembly of the two housing halves 18 and 20 is accomplished by fitting the face areas 28a of housing half 18 in sealing engagement with the face areas 28b of housing half 20. As shown, each housing half 18 and 20 comprises a frame which forms the bellows assembly chamber 30, gas inlet chamber 32, and manifold 36. Gas outlet chamber 34 is carried by housing half 20 behind web 35. In addition, housing half 18 carries half conduits 38a, 40a, and 42a and housing half 20 carries half conduits 38b, 40b and 42b. Half conduits 38a, 38b; 40a, 40b; and 42a, 42b cooperate to form conduits 38, 40, and 42, respectively, which communicate between manifold 36 and bellows assembly chamber 30, as illustrated. Furthermore, housing halves 18 and 20 carry portions of conduit 44 which passes from manifold 36 to the interior of outlet chamber 34 in housing half 20. Furthermore, housing halves 18 and 20 carry recessed snap switch frame members 45a and 45b, respectively, which form frame member 45 as well as control shoulder segments 46a and 46b, respectively, which form control shoulder 46. In addition, face areas 28a and 28b of housing halves 18 and 20, respectively, carry semicylindrical apertures 48a and 48b which contain integrally molded seating slots at their base for transparent readout window 16.

Figure 4:
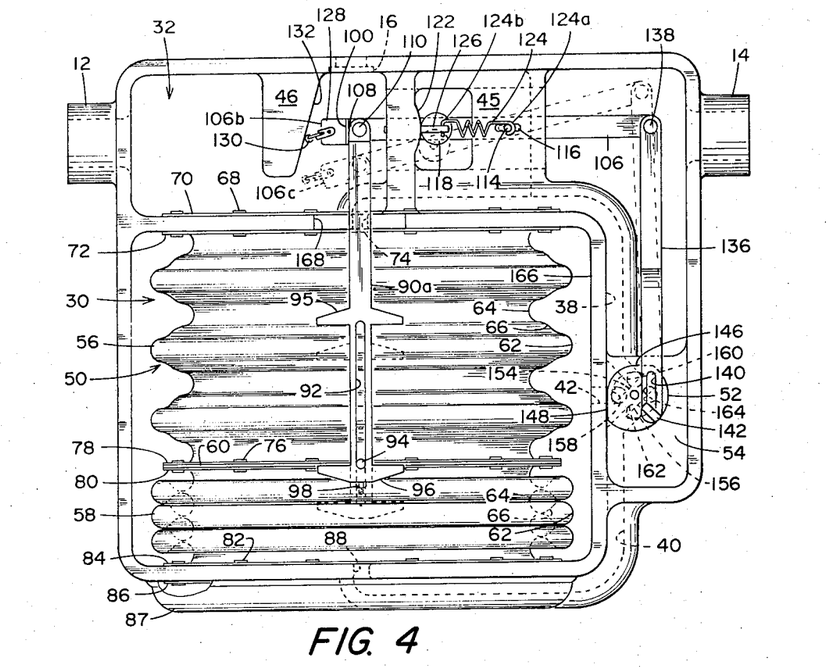
FIGS. 4 and 5 are side elevational views of the front and back, respectively, of the volumetric flow meter of FIG. 1 with the side panels removed.
Figure 5:
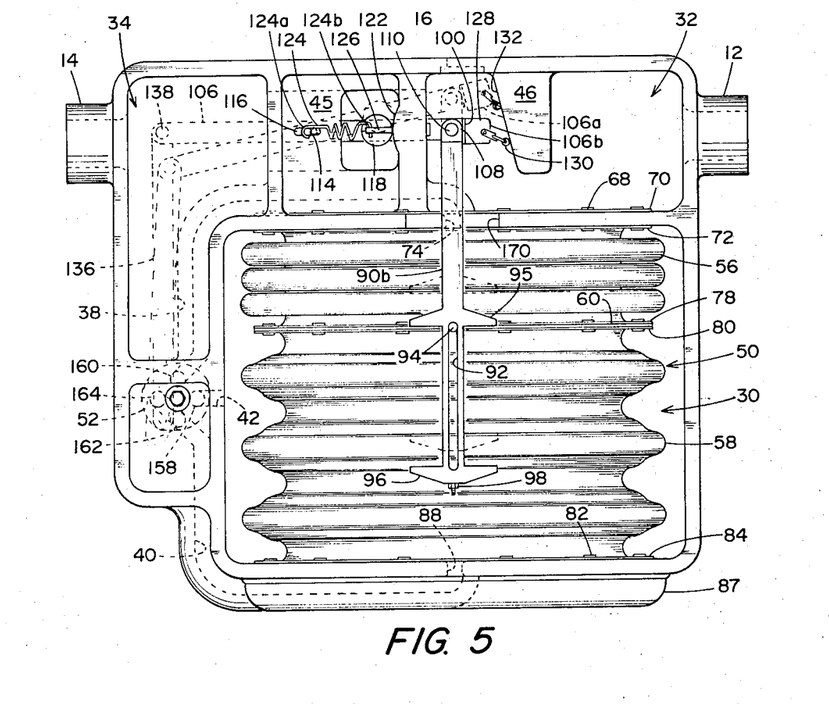

Thus, housing halves 18 and 20 are joined together along face areas 28a and 28b of housing halves 18 and 20, respectively, to form a basic housing for the components for meter 10. FIGS. 4 and 5 show the internal components of meter 10 after housing halves 18 and 20 are joined together. Specifically, FIG. 4 is a side elevational view of meter 10, with side panel 22 removed, and FIG. 5 is a side elevational view of FIG. 10 with side panel 24 removed. As illustrated, when meter 10 is assembled, bellows assembly 50 is positioned within bellows assembly chamber 30, slider valve 52 is rotatably positioned upon manifold face 54 of manifold 36, and the basic snap switch actuation mechanism for slider valve 52 is positioned in frame 45 within inlet chamber 32.

Bellows assembly 50 basically comprises two tubular extensible bellows members 56 and 58 which are axially aligned within bellows assembly chamber 30. Bellows members 56 and 58 are each operatively attached to a common thrust plate 60, which is preferably made of aluminum or stainless steel. It is noted that each bellows member 56 and 58 comprises an extensible and flexible tubular body which includes a series of outer annular convex semicylindrical hoops 62, and a series of inner annular concave semicylindrical hoops 64, being of less diameter than the outer annular hoops 62 and disposed between adjacent outer annular hoops 62. The outer annular hoops 62 and the inner annular hoops 64 are joined by the web sections 66. As shown, the web sections 66 comprise flexible segments interconnecting the sidewalls of the inner annular hoops 64 with adjacent sidewalls of opposed outer annular hoops 62. The cross sectional configuration of each flexible web section 66 appears as a contiguous reversed arcuate configuration which naturally conforms to the contour of the sidewalls of each inner annular hoop 64 and adjacent outer annular hoops 62 when the bellows members 56 and 58 are contracted (see bellows member 58 of FIG. 4) such that the cross section of the contracted sidewall as shown in FIG. 4 has the appearance of two rows of stacked circular objects. However, as the bellows extend, such as bellows member 56 illustrated in FIG. 4 or bellows member 58 illustrated in FIG. 5, the flexible web sections 66 are flexed outwardly in response to the gas pressure to allow maximum expansion and extension of each bellows within the chamber. Bellows members 56 and 58 can be made out of any suitable material such as fiber-reinforced rubber molded by conventional techniques.

Figure 6:
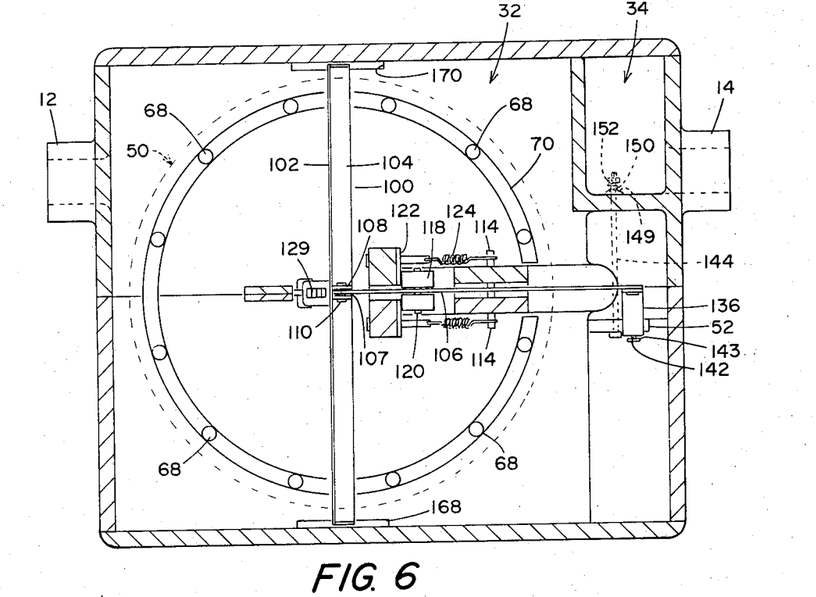
FIG. 6 is a sectional view taken along lines 6—6 of FIG. 1.

The upper end of bellows member 56 is attached to the top of bellows assembly chamber 30 via rivet and ring assemblies. As shown, rivets 68 pass through broken ring 70, the upper wall of bellows chamber 30 and hold down ring 72. This forms a gas tight attachment for the upper end of bellows member 56. In addition, as shown in FIGS. 4 and 6, this arrangement will allow conduit 38 to communicate with the interior of bellows member 56 via port 74. The lower end of bellows member 56 is operatively attached to thrust plate 60 via rivets 76 and hold down rings 78 and 80. This forms a gas tight attachment for the lower end of bellows member 56.

Figure 8:
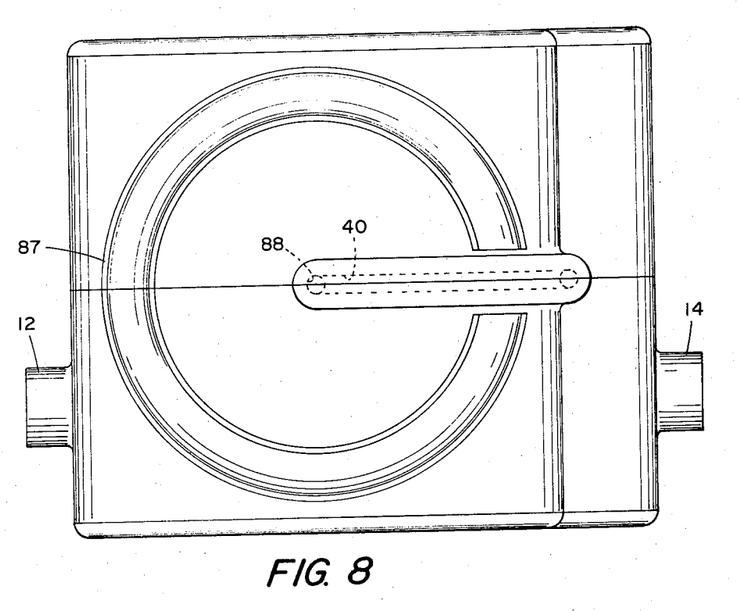
FIG. 8 is a bottom plan view of the volumetric flow meter of FIG. 1.

Likewise, the upper end of bellows member 58 is attached to thrust plate 60 via rivets 76 and hold down rings 78 and 80. The lower end of bellows member 58 is attached to the bottom of bellows chamber 30 via rivets 82, hold down ring 84 and broken ring 86 (FIGS. 4, 5 and 8). This will allow conduit 40 to communicate with the interior of bellows 58 via port 88.

It is noted that the heads of rivets 68 and 82 engage rings 72 and 84 and broken rings 70 and 86 which provide reinforcement needed to prevent the plastic material of the meter housing from extruding past the rivets. Plastic sealing ring 87 which generally comprises an annular split ring which has a U-shaped cross-sectional configuration, is attached to meter 10 over the heads of rivets 82 by welding, cementing or other suitable methods in a manner shown in FIGS. 4, 5 and 8. It is noted that meter 10 will normally be strapped or suspended into place upon an upright support and will generally not rest on plastic sealing ring 87 when in operative position. However, plastic sealing ring 87 can have a sufficient height to provide a stable platform on which to rest the meter 10 as shown in FIGS. 4 and 5.

A pair of vertical control rods 90a and 90b are positioned adjacent and axially of bellows assembly 50. Each control rod 90a and 90b is identical and carries vertical slot 92, which receives guide lug 94, carried by thrust plate 60. In addition, stops 95 and 96 extend outwardly from control rods 90a and 90b at points adjacent the ends of vertical slots 92 as shown in FIGS. 4 and 5. It is noted that the lower stop 96 of control rods 90a and 90b is adjustably mounted to move vertically along the end of the control rods 90a and 90b by the action of lock nut and bolt assemblies 98. The volumetric capacity of bellows assembly 50 can be adjusted by lock nut and bolt assemblies 98. Thus, as can be seen, the extension of bellows 56 will cause lugs 94 to contact the lower ends of slots 92, and outer peripheral portions of thrust plate 60 to contact the lower stops 96 of each control arm 90a and 90b. Likewise, the extension of bellows 58 results in lugs 94 contacting the upper portions of slots 92, and outer peripheral portions of thrust plate 60 to contact the upper stops 95 of control rods 90a and 90b, respectively.

The upper ends of control rods 90a and 90b are fixedly attached to horizontal control bar 100 as shown in FIGS. 4–7. Horizontal control bar 100 basically comprises a member having an L-shaped cross sectional area with a vertical leg 102 and a horizontal leg 104. Horizontal control bar 100 is pivotally attached adjacent its midsection to snap switch arm 106. Specifically, leg 104 of horizontal control bar 100 carries slot 107 adjacent its midsection and vertical flanges 108 extend upwardly on either side of slot 107. The leading end of snap switch arm 106 is pivotally mounted to vertical flanges 108 by rivet sleeve assembly 110.

Snap switch arm 106 is positioned through vertical slot 112 (FIG. 7) which is formed from opposed recessed areas on frame sections 45a and 45b of housing halves 18 and 20, respectively. In addition, snap switch arm 106 carries pivot pins 114 which extend through horizontal pivot slots 116 of housing halves 18 and 20, respectively.

Rollers 118 are mounted on snap switch arm 106 via axle means 120. Rollers 118 rest upon arcuate follower surfaces 122 which are carried by frame 45. More specifically, axle means 120 is mounted through snap switch arm 106 at a point one-half the distance between rivet and sleeve assembly 110 and pivot pins 114. Furthermore, rollers 118 are urged toward arcuate follower surfaces 122 by the action of spring members 124. Spring members 124 comprise a conventional coil tension spring carrying a hook 124a at one end thereof which extends around a pivot pin 114, and a leg 124b at the opposite end thereof which extends through an aperture carried by a pin 126. Pin 126 extends through an aperture within the portion of frame 45 which carries a follower surface 122.

It is noted that the combined action of rollers 118, arcuate follower surfaces 122, and spring members 124 function to move snap switch arm 106 from its position as shown in solid line in FIGS. 4 and 5 to its upper and lower valve actuating positions as shown in broken line in FIGS. 5 and 4, respectively. This action will be discussed in detail below.

Digital counter means 128 is mounted on leg 102 of horizontal control bar 100 and carries a cantilever roller follower assembly 130 which maintains contact with inclined surface 132 of shoulder 46 so that upward pivotal movement of snap switch arm 106 will cause the depression of cantilever roller follower 130 and an actuation of digital counter 128. The digital counter 128 can be any conventional mechanically operated digital counter mechanism known in the art.

Figure 7:
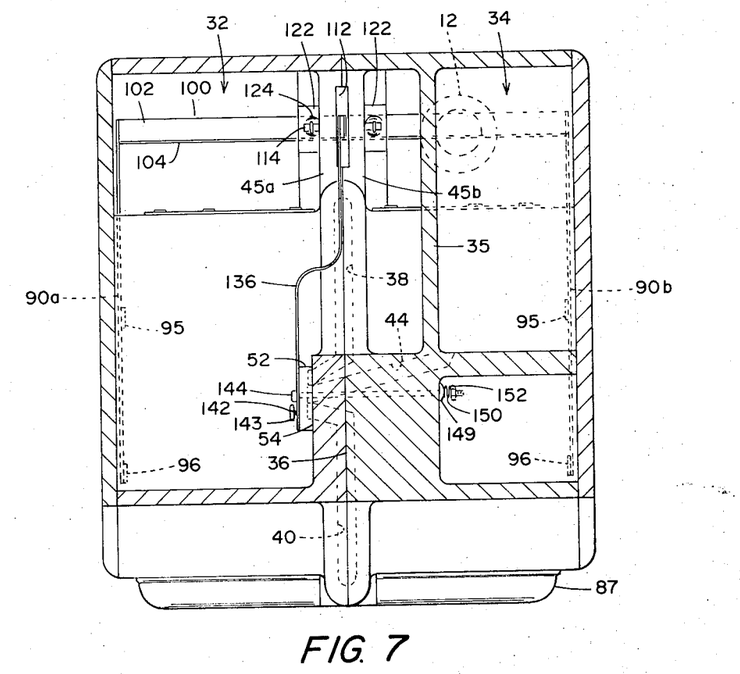
FIG. 7 is a sectional view taken along lines 7—7 of FIG. 1.

The second end of snap switch arm 106 is pivotally mounted to valve control arm 136 via rivet and sleeve assembly 138. As shown in FIGS. 4 and 7, valve control arm 136 is offset adjacent its midsection and carries vertical control slot 140 at its lower end which receives slider valve control pin 142.

Figure 9:
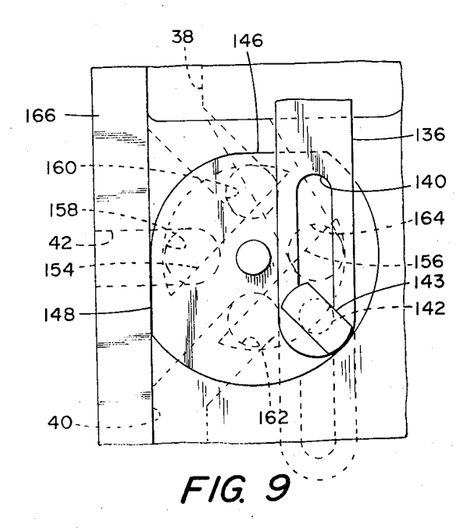
FIG. 9 is a detail view of the flow control valve of the volumetric flow meter of FIG. 1.

Thus, as can be seen, slider valve control pin 142 which carries an integral retaining flange 143 extends from an outer peripheral portion of slider valve 52. Slider valve 52 is pivotally mounted to manifold face 54 via bolt 144. Slider valve 52 as shown in FIGS. 4, 7 and 9 comprises a disc having a pair of flattened sides 146 and 148. An aperture extends through the midportion of slider valve 52 which receives bolt 144. Bolt 144 extends completely through the manifold 36. Washer 149, spring 150 and a nut 152 are retained to the threaded end of bolt 144 and function to maintain slider valve 52 firmly upon the manifold face 54. A pair of arcuate flow cavities 154 and 156 are positioned generally parallel on the underside of slider valve 52. When slider valve 52 is positioned in its first position as shown in FIG. 4, flattened side 148 is flush against inner wall 106 of housing half 18, and flow cavity 154 serves to interconnect ports 158 and 160, on manifold face 54. Port 158 communicates with conduit 42 and port 160 communicates with conduit 38. In addition, with slider valve 52 in its first position as illustrated in FIG. 4, flow cavity 156 serves to interconnect valve port 162 and valve port 164. Valve port 162 communicates with conduit 40 and valve port 164 communicates with conduit 44. Slider valve 52 is preferably made of metal so that when in operation on plastic manifold face 54, a coefficient of friction on the order of about 0.1 results therebetween.

Thus, it is noted that slider valve 52 operates in a circular mode about bolt 144, which is held in place by a nut-washer spring loading mechanism. Specifically, spring 150 rests between washer 149 and nut 152 to thereby urge slider valve 52 snugly against the upper flat surface of manifold face 54 (FIG. 7). In addition, slider valve 52 is urged against manifold 54 by the pressure of gas within the inlet side of the meter. Thus, as can be seen in FIG. 7, inlet chamber 32 communicates not only with the upper portion of the meter which contains the snap switch arm 106 and its associated components, but also with the chamber which contains slider valve 52. Since the inlet side of the meter to which the exterior of slider valve 52 is exposed is subjected to a higher gas pressure than the outlet side of the meter, which includes outlet chamber 34 and conduit 44, slider valve 52 is further urged in sealing contact against the face of manifold 54.

Figure 10:
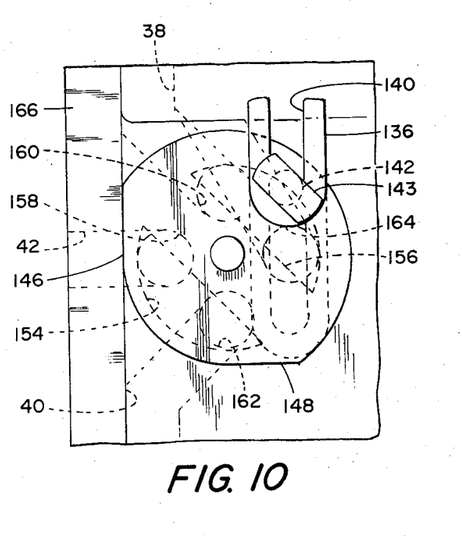
FIG. 10 is a detail view of the flow control valve in a second position.

In the operation of slider valve 52, which will be explained in detail below, valve control arm 136 which reciprocates basically in a vertical plane will move slider valve 52 from the first position as illustrated in FIGS. 4 and 9 to its second position, as illustrated in FIG. 10. Slider valve 52 is moved to its second position as illustrated in FIG. 10 by the upward vertical movement of valve control arm 136 which causes a corresponding counterclockwise motion of slider valve 52. When slider valve 52 is in its second position, flow cavity 154 now allows communication between valve ports 158 and 162 and flow cavity 156 allows communication between valve ports 160 and 164.

Inlet flow chamber 32 is in fluid flow communication with the outer portion of bellows assembly 50 via flow passages 168 (FIG. 4) and 170 (FIG. 5) which also receive control rods 90a and 90b, respectively. In addition, gas flow from inlet conduit 12 is free to pass through the inlet chamber 32 of device 10 containing the snap switch mechanism to the chamber containing valve control arm 136 and slider valve 52, as shown in FIGS. 4, 6 and 7. Outlet chamber 34, which communicates with outlet conduit 44 is sealed from the remaining internal portions of meter 10. Thus, outlet chamber 34 can communicate with the interior portion of meter 10 only through conduit 44 which passes through manifold 36 to port 164, which in turn communicates with slider valve 52.

In operation of meter 10, inlet conduit 12 and outlet conduit 14 are operatively connected to suitable piping in a conventional manner. For example, when the housing of meter 10 is made of a thermoplastic material such as polyethylene, inlet conduit 12 and outlet conduit 14 can be operatively attached to plastic gas pipes by heat sealing, solvent welding, cementing, or the like. When the attachment between suitable gas inlet and outlet piping is made, gas will pass directly into inlet conduit 12 and through gas inlet chamber 32, flow passages 168 and 170, into conduit 42 and through port 158 into a flow cavity carried by slider valve 52. Thus, with slider valve 52 in its first position as illustrated in FIGS. 4 and 9, gas will pass through flow cavity 154, port 160, conduit 38, and into the interior of bellows member 56 via port 74. At this time, the snap switch arm 106 is in its upper position 106a, as illustrated in broken line in FIG. 5. The gas passing into the interior of bellows member 56 causes extension of bellows member 56 in a manner as illustrated in FIG. 4. More specifically, the gas flow passing into bellows member 56 is forced against thrust plate 60 which is a flow barrier between bellows member 56 and bellows member 58. Accordingly, thrust plate 60 is pushed downwardly as shown in FIG. 4 and guide lugs 94 slide downwardly within vertical slots 92, which are carried by control rods 90a and 90b, respectively.

The downward pressure exerted by thrust plate 60 upon bellows 58 causes a contraction of bellows 58. Therefore, the gas within the interior of bellows 58 flows freely therefrom via port 88 and conduit 40 to port 162 of manifold 36. The gas flows from port 162 through flow cavity 156 of slider valve 52 to port 164, and then through conduit 44 into outlet chamber 34. The gas is then passed from outlet chamber 34 through outlet conduit 14. The expansion of bellows 56 continues and the lower stops 96 contact the outer periphery of thrust plate 60 and thereby move control rods 90a and 90b and the first end of snap switch arm 106 downwardly causing snap switch arm 106 to pivot about pivot pins 114. Therefore, valve control arm 136 is accordingly moved upwardly in a vertical plane. The upward movement of valve control arm 136 causes no movement of slider valve 52 as control slot 140 moves upwardly from a position shown in broken line in FIG. 9 wherein the upper end of control slot 140 contacts slider valve control pin 142 to the position shown in solid line in FIG. 9 wherein the lower end of control slot 140 contacts slider valve control pin 142.

As thrust plate 60 reaches the position shown in FIG. 4, it has utilized the energy of the inflowing gas to move snap switch arm 106 from the point 106a, shown in broken line in FIG. 5 to point 106b, shown in solid line in FIG. 4, whereupon the potential energy stored in springs 124 is utilized to rapidly move snap switch arm 106 to position 106c, shown in broken line in FIG. 4 via a tangential force due to the follower surface 122 and rollers 118. It is noted that pivot pins 114 slide forwardly to the position illustrated in broken line in FIG. 4 as snap switch arm 106 is instantly pivoted to the downward position. However, it should be noted that control rods 90a and 90b and rivet and sleeve assembly 110 are constrained to move only in a vertically straight line. More specifically, rivet and sleeve assembly 110 traverses a locus which is represented by straight line due to the fact that the center of rollers 118 is at a point half way between the end pivot point (rivet and sleeve assembly 110) and the snap switch arm fulcrum pin point (pivot pins 114), and it rolls over an arcuate surface 122. This geometric feature is of prime interest in explaining the anti-jam properties of the control mechanism for the slider valve 52, as the first end of snap switch arm 106 is kinematically constrained at one end to move only along a straight vertical line and has little or no side motion imparted from thrust plate 60. Thus, as snap switch arm 106 reaches the point 106b as illustrated in FIG. 4, the energy in springs 124 automatically moves snap switch arm 106 to position 106c and causes upward movement of valve control arm 136 which in turn moves slider valve 52 90° along a circular arc to its second position as illustrated in FIG. 10 such that flattened side 146 is now flush against inner wall 166. Therefore, flow cavity 154 now allows communication between ports 158 and 162, and flow cavity 156 now allows communication between ports 160 and 164. It is noted at this point, slider valve control pin is in contact with the lower portion of control slot 140 as illustrated in solid line in FIG. 10. Thus, the instant pivotal movement of snap switch arm 106 causes a 90° counterclockwise rotation of slider valve 52 which in turn, reverses the role for each bellows 56 and 58 of bellows assembly 150.

When slider valve 52 is in its second position as illustrated in FIG. 10, the inflowing gas passing through inlet chamber 32, flow passages 168 and 170, and into conduit 42 flows from port 158 through flow cavity 154 to port 162, and then from port 162 to conduit 40 and then is exhausted via port 88 into the interior of bellows member 58. Likewise, the gas in the interior of bellows member 56 is free to pass into conduit 38 via port 74, through port 160, flow cavity 156, port 164 and then to outlet chamber 34 via conduit 44.

The gas flowing into bellows member 58 and against the flow barrier thrust plate 60 causes an extension of bellows member 58. Accordingly, the extension of bellows member 58 causes a contraction of bellows member 56 and the gas in bellows member 56 is expelled from port 74. The extension of bellows member 58 continues until the upper stop 95 contacts upper peripheral portions of thrust plate 60, as illustrated in FIG. 5. When this contact is made, thrust plate 60 will thereby move control rods 90a and 90b upwardly in vertical plane. This movement will in turn cause snap switch arm 106 to move from its downward position 106c as illustrated in broken line in FIG. 4 to its horizontal position 106b as illustrated in solid line in FIG. 5. This movement will in turn cause valve control arm 136 to move downwardly in a vertical plane, as illustrated in broken line in FIG. 10. More specifically, valve control arm 136 moves downwardly from a point wherein the lower portion of control slot 140 is in contact with slider valve control pin 142 to a position wherein the upper portion of control slot 140 is in contact with slider valve control pin 142. The latter position is shown in broken line in FIG. 10.

Thus, as the thrust plate 60 reaches the position as shown in FIG. 5, snap switch arm 106 is moved to point 106b whereupon the potential energy stored in the springs 124 is utilized to snap or instantaneously move snap switch arm 106 to position 106a shown in broken line in FIG. 5, via a tangential force due to the follower surface 122 and rollers 118. This action in turn causes an instantaneous downward movement of valve control arm 136 from a position as illustrated in broken line in FIG. 10 to its position as illustrated in broken line in FIG. 9, thereby causing a 90° clockwise rotation of slider valve 52 to its first position wherein flow cavity 154 communicates between ports 158 and 160 thereby allowing inlet gas to pass to the interior of bellows member 56 and flow cavity 156 allows fluid passage between port 162 and port 164 to thereby allow gas to pass from the interior of bellows member 58 to outlet chamber 34 and outlet 14. As can be seen, this action reverses the roles of bellows members 56 and 58. This cycle proceeds continuously as long as gas is passed through meter 10.

As snap switch arm 106 is pivoted upwardly to its position 106a, cantilever roller follower arm 130, which rides upon inclined surface 132 of shoulder 34, is depressed downwardly. This downward depression continues until snap switch arm 106 reaches its upward position at 106a, whereby cantilever roller follower arm 130 actuates the mechanical digital counter 128. At this time, mechanical digital counter 128 records upward movement of snap switch arm 106 via its readout window 129 (FIG. 6), which in turn is exposed through the housing of meter 10 via transparent readout window 16. Thus, mechanical digital counter 128 is actuated each time snap switch arm 106 reaches position 106a as illustrated in broken line in FIG. 5. This will record one complete cycle of bellows assembly 50, which includes the extension and contraction of each bellows 56 and 58, respectively.

Thus, the readout from device 10 is accomplished by counting the number of bellows volumes of gas that have passed therethrough. The simplest readout is to measure a standard cubic foot each cycle and count the number of times snap switch arm 106 goes through a complete cycle. Thus, it is generally preferred that one-half cubic foot of gas be required to extend each bellows member 56 and 58 of bellows assembly 50 during each complete cycle.

It is noted that the configuration of bellows members 56 and 58 of bellows assembly 50 represents an ideal geometric configuration for maximum extension and compression of the bellows in the bellows assembly. Thus, by utilizing this particular geometry, each bellows member 56 and 58 of bellows assembly 50 can be stretched to the farthest distance without significant stresses either in outer annular hoops 62 or inner annular hoops 64 being developed in the bellows material. This is particularly significant as the ratio of compressed height to fully extended height directly affects the total number of cycles that the bellows must traverse to pass a given quantity of gas, and the volumetric efficiency of meter 10 itself. In meter 10, most of the interior space within bellows assembly 50 and bellows chamber 30, is utilized directly for gas measurement. More specifically, as illustrated by bellows member 58 in FIG. 4, the outer hoops 62 and inner hoops 64 interfold in a manner as illustrated in broken line such that the cross section of outer hoops 62 and inner hoops 64 resembles a pair of stacked circles. This configuration is obtainable because of the flexible nature of web sections 66 which interconnect inner hoops 64 with adjacent outer hoops 62. Furthermore, as illustrated by bellows member 56 in FIG. 4, as the bellows is expanded, web sections 66 which interconnect the inner hoops 64 with adjacent outer hoops 62 invert due to pressure within the bellows and allow for maximum gas displacement of the bellows material.

Furthermore, it is noted that slot 140 provides the slack in the system allowing slider valve 52 to remain in a fixed position while the actuating mechanism (snap switch arm 106) is being "cocked" by the gas pressure in the high pressure or inlet bellows of bellows assembly 50. After snap switch arm 106 reaches its neutral point 106b (wherein rollers 118 are positioned at the apex of arcuate follower surfaces 122) snap switch arm 106 is then moved to a valve actuating position (either position 106a or 106b) and slider valve 52 is snapped 90° and stopped by either flattened sides 146 or 148. Thus, when snap switch arm 106 is in position 106b, it thereafter rapidly moves either to the upper position 106a (illustrated in broken line in FIG. 5) or its downward position 106c (illustrated in broken line in FIG. 4) in response to either upward movement of thrust plate 60 or downward movement of thrust plate 60, respectively. This actuating mechanism thereby snaps in a manner similar to the common household light switch. It is noted that many variations of device 10 as shown in the drawings, can be made within the scope of this invention. For example, it is within the scope of this invention to position mechanical digital counter 128 on the opposite end of snap switch arm 106 adjacent rivet and sleeve assembly 138, and to thereby operatively position shoulder 46 and inclined surface 132 adjacent rivet sleeve assembly 138. In addition, if desired, a pressure regulator means can be positioned within inlet chamber 32 in operative communication with inlet conduit 12.

Thus, while this invention has been described in relation to its preferred embodiments, it is to be understood that various modifications thereof will now be apparent to one skilled in the art upon reading this specification and it is intended to cover such modifications as fall within the scope of the appended claims.

I claim:
1. A volumetric fluid flow meter comprising:
   a. a housing having a fluid flow inlet and a fluid flow outlet in operative communication therewith, and containing a bellows chamber;
   b. a bellows assembly comprising first and second axially aligned, enclosed cooperating bellows mem- bers, each said bellows member having a fluid flow port communicating with its interior, said bellows assembly disposed in said chamber and positioned for opposed extension and contraction of said bellows members whereby the extension of one said bellows member causes contraction of the other said bellows member;

c. valve means providing fluid flow passageways between said inlet and the port of said bellows member and said outlet and the port of said second bellows member when in a first position, and fluid flow passageways between said inlet and the port of said second bellows member and said outlet and the port of said first bellows member when in a second position;

d. means to actuate said valve to said first and second positions in response to the full extension of said second and first bellows members respectively; and e. counter means for recording the extension cycles of said bellows assembly.

2. The fluid flow meter of claim 1 wherein said means to actuate said valve comprises:

a. a first control arm means positioned in said housing transverse of said bellows assembly, said first control arm comprising a first end and a second end and pivotally mounted in said housing adjacent its midportion;

b. means to rapidly move said first control arm from a neutral non-pivoted position to a first and second pivoted position in response to downward and upward force respectively on the first end thereof;

c. a second control arm means pivotally mounted to said first end of said first control arm means and extending generally adjacent said bellows assembly and carrying spaced first and second stop members for engaging and following said bellows assembly as said first and second bellows members are extended, respectively; and d. third control arm means pivotally mounted between said second end of said first control arm means and said valve means to position said valve means in said first and second positions in response to pivoting action of said first control arm means.

3. The fluid flow meter of claim 2 wherein said counter means comprises digital counter means for recording the extension cycles of said bellows assembly.

4. The fluid flow meter of claim 3 wherein said digital counter means comprises a mechanical digital counter operatively positioned on one end of said first control arm, and control shoulder means positioned in said housing adjacent said end of said first control arm for actuating said mechanical digital counter when said first control arm is pivoted.

5. A volumetric gas flow meter comprising:

a. a housing having a gas inlet and a gas outlet communicating therewith, and containing a bellows chamber;

b. a bellows assembly comprising first and second axially aligned enclosed bellows members disposed in said bellows chamber, and positioned for opposed extension and contraction of said bellows members whereby the extension of one said bellows member causes contraction of the other said bellows member;

c. a valve means having first, second, third and fourth valve ports and movable to a first position which provides a first flow path between said first and second valve ports and a second flow path between said third and fourth valve ports, and to a second position which provides a third flow path between said first and third valve ports and a fourth flow path between said second and fourth valve ports;

d. first fluid flow conduit means communicating between said inlet and said first valve port;

e. second fluid flow conduit means communicating between said second valve port and the interior of said first bellows;

f. third fluid flow conduit means communicating between said third valve port and said interior of said second bellows;

g. fourth fluid flow conduit means communicating between said fourth valve port and said outlet;

h. actuation means to move said valve means to said first and second positions in response to the extension of said second and first bellows, respectively; and i. digital counter means for recording the extension cycles of said bellows assembly.

6. A volumetric gas flow meter comprising:

a. a housing having a gas inlet and a gas outlet communicating therewith, and containing a bellows chamber;

b. a bellows assembly comprising first and second axially aligned enclosed bellows members disposed in said bellows chamber, and positioned for opposed extension and contraction of said bellows members whereby the extension of one said bellows member causes contraction of the other said bellows member;

c. a valve means having first, second, third and fourth valve ports and movable to a first position which provides a first flow path between said first and second valve ports and a second flow path between said third and fourth valve ports, and to a second position which provides a third flow path between said first and third valve ports and a fourth flow path between said second and fourth valve ports;

d. first fluid flow conduit means communicating between said inlet and said first valve port;

e. second fluid flow conduit means communicating between said second valve port and the interior of said first bellows;

f. third fluid flow conduit means communicating between said third valve port and said interior of said second bellows;

g. fourth fluid flow conduit means communicating between said fourth valve port and said outlet;

h. actuation means to move said valve means to said first and second positions in response to the extension of said second and first bellows, respectively, said actuation means comprising:

a first control arm positioned transversely of said bellows assembly and having a first and a second end, and rotatably pivoted adjacent its midpoint, and carrying roller means between said first end and said midportion;

a convex arcuate follower surface carried by said housing and positioned to receive said roller means;

spring means urging said roller means against said arcuate surface;

second control arm means pivotally attached to said first end of said first control arm means and positioned adjacent said bellows assembly and carrying spaced first and second stop means for engaging and following said bellows assembly as said first and second bellows members extend, respectively;

third control arm means pivotally mounted between said second end of said first control arm means and said valve means; and i. digital counter means for recording the extension cycles of said bellows assembly.

7. The volumetric gas flow meter of claim 6 wherein said valve means comprises:
   a. a manifold carrying said first, second and third valve ports and comprising a facing having first, second, third and fourth apertures communicating with said first, second, third and fourth valve ports, respectively; and
   b. a rotatable slider member positioned on said facing and carrying first and second fluid flow cavities in communication with said apertures such that in said first position a first flow path is formed between said first and second apertures and said first cavity and a second flow path is formed between said third and fourth apertures and said second cavity and when rotated to a second position, said third flow path is formed between said first and third apertures and said first cavity and said fourth flow path is formed between said second and fourth apertures and said second cavity.

8. The volumetric gas flow meter of claim 7 wherein said rotatable slider member is rotatably attached to said facing through the midportion thereof; said first, second, third and fourth apertures are positioned generally uniformly around the rotatable attachment; and a slider valve control pin extends outwardly from a peripheral portion of said rotatable slider member, and wherein a control slot is carried by said third control arm means which receives said slider valve control pin.

9. The volumetric gas flow meter of claim 5 wherein said bellows assembly comprises two flexible extensible tubular bodies each having its first end attached in sealing engagement to a common thrust plate and each having its second end attached in sealing engagement to the interior of said bellows chamber.

10. The volumetric gas flow meter of claim 5 wherein each said bellows member comprises an extensible flexible tubular body including outer annular convex semicylindrical reinforcing hoops; inner annular concave semicylindrical reinforcing hoops disposed between adjacent outer annular hoops and being of less diameter than said outer annular hoops, and flexible web sections interconnecting the sidewalls of said inner annular hoops with adjacent sidewalls of opposed outer annular hoops.

11. The volumetric gas flow meter of claim 5 wherein said housing is a molded plastic body comprising:
   a. first and second annular housing midsections, said first and second annular housing midsections matching to form said bellows chamber, the chamber for said actuation means, and said first, second, third and fourth fluid flow conduit means, when sealed together; and
   b. first and second end sections which enclose opposed sides of said first and second annular housing midsections, respectively.

12. A volumetric fluid flow meter comprising:
   a. a housing having a fluid flow inlet and a fluid flow outlet in operative communication therewith, and containing a bellows chamber;
   b. a bellows assembly comprising a bellows thrust plate positioned for reciprocal movement within said bellows chamber, first extensible bellows means positioned between said bellows thrust plate and a side of said bellows chamber and adapted to thereby extend against said bellows thrust plate, second extensible bellows means positioned between the opposite side of said bellows thrust plate such that the extension of each bellows means moves said thrust plate against the other said bellows means causing contraction thereof, each said bellows means having fluid flow port means communicating with its interior;
   c. valve means providing fluid flow passageways between said inlet and the port means of said first bellows means, and said outlet and the port means of said second bellows means when in a first position; and fluid flow passageways between said inlet and the port of said second bellows means, and said outlet and the port of said first bellows means when in a second position;
   d. means to actuate said valve means to said first and second positions in response to the full extension of said second and first bellows members, respectively and
   e. counter means for recording the extension cycles of said bellows assembly.

13. The fluid flow meter of claim 12 wherein said means to actuate said valve comprises:
   a. a first control arm means positioned in said housing transverse of said bellows assembly, said first control arm comprising a first end and a second end and pivotally mounted in said housing adjacent its midportion;
   b. means to rapidly move said first control arm from a neutral non-pivoted position to a first and second pivoted position in response to downward and upward force respectively on the first end thereof;
   c. a second control arm means pivotally mounted to said first end of said first control arm means and extending adjacent said bellows assembly and carrying spaced first and second stop members for engaging and following said bellows thrust plate as said first and second bellows means are extended, respectively; and
   d. third control arm means pivotally mounted between said second end of said first control arm means and said valve means to position said valve means in said first and second positions in response to pivoting action of said first control arm means.

14. The fluid flow meter of claim 13 wherein said counter means comprises digital counter means for recording the extension cycles of said bellows assembly.

15. The fluid flow meter of claim 14 wherein said digital counter means comprises a mechanical digital counter operatively positioned on one end of said first control arm, and control shoulder means positioned in said housing adjacent said end of said first control arm for actuating said mechanical digital counter when said first control arm is pivoted.

* * * * *

PO-1050
(5/69)

UNITED STATES PATENT OFFICE
CERTIFICATE OF CORRECTION

Patent No. 3,808,886           Dated May 7, 1974

Inventor(s) Fred L. Goldsberry

It is certified that error appears in the above-identified patent and that said Letters Patent are hereby corrected as shown below:

Col. 6, line 34, after "wall", "106" should be --166--.

Signed and sealed this 8th day of October 1974.

(SEAL)
Attest:

McCOY M. GIBSON JR.              C. MARSHALL DANN
Attesting Officer                Commissioner of Patents